April 17, 1945.   C. R. HANNA   2,374,012
VOLTAGE REGULATING SYSTEM
Filed May 20, 1943
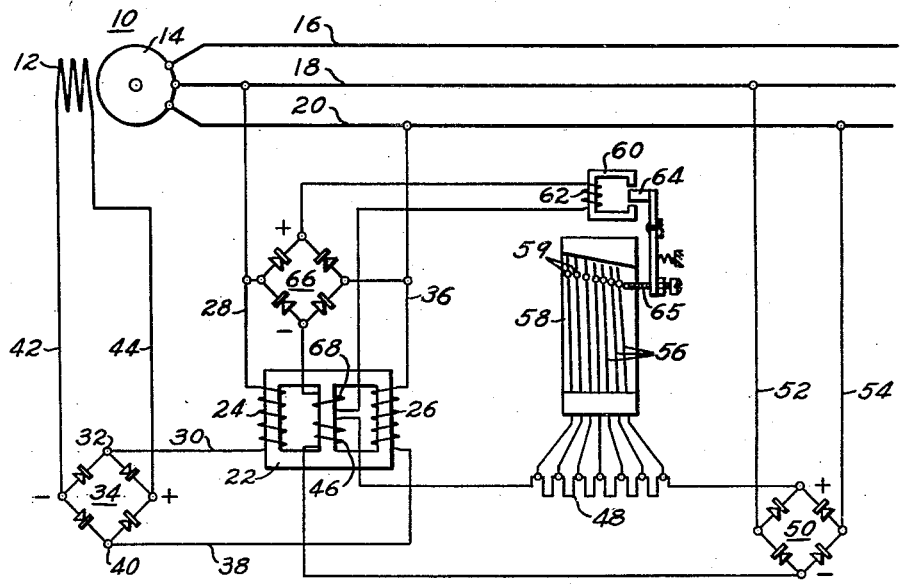
WITNESSES:
James F. Young
INVENTOR
Clinton R. Hanna.
BY
James N. Ely
ATTORNEY Patented Apr. 17, 1945

2,374,012

UNITED STATES PATENT OFFICE 2,374,012

VOLTAGE REGULATING SYSTEM

Clinton R. Hanna, Pittsburgh, Pa., assignor to Westinghouse Electric & Manufacturing Company, East Pittsburgh, Pa., a corporation of Pennsylvania Application May 20, 1943, Serial No. 487,765

6 Claims. (Cl. 171—119)

This invention relates to voltage regulating systems.

An object of this invention is to provide for maintaining the voltage of a dynamo-electric machine substantially constant.

Another object of this invention is to provide a sensitive regulating system having anti-hunting characteristics.

A more specific object of this invention is to utilize a saturable reactor for effecting voltage regulation and providing anti-hunting characteristics in a voltage regulating system.

Other objects of this invention will become apparent from the following description when taken in conjunction with the accompanying drawing, the single figure of which is a diagrammatic view of the circuits and apparatus embodying the teachings of this invention.

Referring to the drawing, this invention is illustrated as applied to maintaining the voltage of a generator 10 substantially constant. The generator 10 may be driven by any suitable prime mover (not shown) and comprises a field winding 12 and an armature winding 14 connected by line conductors 16, 18, and 20 to supply power to a load (not shown).

Associated with the field winding 12 and disposed to control the excitation current thereof is a saturable reactor 22. The saturable reactor 22 is of conventional three-legged design having alternating-current windings 24 and 26 on its outer legs, the winding 24 being connected at one end by conductor 28 to the line conductor 18 and at the other end by conductor 30 to the terminal 32 of a rectifier unit 34. The other alternating-current winding 26 is connected at one end by conductor 36 to the line conductor 20 and at the other end by conductor 38 to the terminal 40 of the rectifier unit 34. The rectifier unit 34 is connected across the field winding 12 by the conductors 42 and 44.

In order to control the impedance of the reactor 22, a main direct-current winding 46 is disposed on the middle leg of the reactor 22, the winding 46 being connected through a sectional resistor 48 across a rectifier 50 which is connected by conductors 52 and 54 to line conductors 18 and 20, respectively. The sectional resistor 48 is provided with a plurality of taps progressively connected to the fixed ends of self-biased spring switch members 56 of a switching apparatus 58. The free ends of the switching members 56 carry contact members 59 and are disposed to be progressively actuated to circuit closing positions to effectively shunt progressive sections of the resistor 48. The switching apparatus 58 is well known, being generally shown and described in Patent No. 2,246,301, issued June 17, 1941, to C. R. Hanna et al.

As illustrated, in order to actuate the switch members 56 an electromagnetic unit 60 having an energizing winding 62 and a pivotally mounted armature member 64 is disposed to be energized to operate a driver member 65 to effect the progressive movement of the contact members 59 into and out of engagement. As illustrated, the energizing winding 62 of the electromagnetic unit 60 is connected at one end to the positive terminal of a rectifier unit 66 which is connected across conductors 28 and 36, the other end of the winding 62 being connected through an auxiliary direct-current winding 68 disposed on the middle leg of the reactor 22 to the negative terminal of the rectifier unit 66. In practice the direct-current winding 68 is of negligible size with respect to the direct-current winding 46 and has little, if any, effect on the saturation of the reactor 22. Instead, the winding 68 is provided on the reactor 22 to be responsive to the rate of change in the energization of the main direct-current winding 46 for controlling the energization of the winding 62 of the electromagnetic unit 60.

In operation, the generator 10 is operated to deliver power to the load (not shown) at a predetermined voltage. Under these conditions, the energizing winding 62 of the electromagnetic unit 60 is energized a predetermined amount to maintain the armature member 64 in a predetermined position to effect the shunting of a predetermined number of sections of the resistor 48, as illustrated. As thus shunted, the resistor 48 controls the energization of the main direct-current winding 46 on the middle leg of the reactor 22 to control the degree of saturation of the reactor and, consequently, the impedance of the alternating-current windings 24 and 26 to control the energizing current flowing in the field winding 12 of the generator 10.

If for any reason the load should change so as to effect a change in the voltage across the line conductors 18 and 20, then the energization of the winding 62 is changed to effect a regulating action to correct for the change in voltage. If, for example, the voltage across line conductors 18 and 20 increases, then the energization of the winding 62 of the electromagnetic unit 60 is increased to effect a movement of the driver member 65 to progressively release the contact members 59 and thereby progressively connect additional sections of the resistor 48 in circuit with the direct-current winding 46 of the reactor 22. This increase in the number of sections of the resistor 48 connected in circuit with the direct-current winding 46 effects a reduction in the current flow through the winding 46 to increase the impedance and increase the voltage drop and thereby decrease the current flow in the field winding 12 to effect a decrease in the voltage of the generator 10.

Since the main direct-current winding 46 is large with respect to the auxiliary direct-current winding 68 carried on the middle leg of the reactor 22, any change in the direct-current flux of the winding 46 which links the winding 68 induces a flow of current therein to aid in controlling the energization of the winding 62. If, therefore, the operation of the switching apparatus 58, as described hereinbefore, effects a decrease in the current flow through the direct-current winding 46, then the flux which links the direct-current winding 68 is decreased so that the current induced in the winding 68 which is normally additive to the normal current flow in the winding 62 is decreased to effect a decrease in the total energization of the winding 62 and thereby prevent excessive operation of the switching apparatus 58. The relation of the direct-current windings 46 and 68, therefore, provides anti-hunting characteristics to the regulating system.

If, on the other hand, the voltage across line conductors 18 and 20 decreases, then the energization of the winding 62 is also decreased to effect a movement of the driver member 65 to operate the switch members 56 in a direction to progressively shunt additional sections of the resistor 48 and thereby increase the current flow in the direct-current winding 46 to decrease the impedance of the reactor 22 and increase the excitation of the field winding 12 to effect an increase in the voltage of the generator 10. As in the previous case, the change in the current flow in the main direct-current winding 46 effects a change in the direct-current flux which links the winding 68 to control the energization of the winding 62 of the electromagnetic unit 60. Thus, as the current flow in the winding 46 is increased by the operation of the switching apparatus 58 to shunt the resistor 48, the main direct-current flux which links the winding 68 is increased to effect an increase in the current induced in the winding 68. Since this induced current is additive to the normal current flow in the winding 62, the result is that the energization of the winding 62 is so increased that the movement of the driver member 65 to effect the shunting of the sections of resistor 48 is limited to prevent the shunting of too many sections of the resistor 48 thereby preventing hunting in the regulating operation.

The regulating system described hereinbefore is quite efficient, giving a very close regulation. Anti-hunting characteristics are imparted to the regulating system by the use of a minimum amount of equipment, each element of which is of standard design and which requires very little maintenance in service.

While this invention has been described with reference to a particular embodiment thereof, it is, of course, not to be limited thereto except insofar as is necessitated by the scope of the appended claims.

I claim as my invention:

1. In a regulating system for dynamo-electric machines provided with a field winding, in combination, a saturable reactor connected in circuit relation with the field winding to control the field excitation of the dynamo-electric machine, a direct-current winding carried by the reactor disposed to be energized, a variable resistor connected in circuit with the direct-current winding, and means responsive to the voltage of the dynamo-electric machine disposed to operate the variable resistor to control the saturation of the reactor, said voltage responsive means also being connected in circuit relation with the reactor and responsive to a change in the saturation thereof to prevent excessive operation of the variable resistor in response to a change in the voltage of the dynamo-electric machine.

2. In a regulating system for dynamo-electric machines provided with a field winding, in combination, a saturable reactor connected in circuit relation with the field winding to control the field excitation of the dynamo-electric machine, a main direct-current winding carried by the reactor disposed to be energized, means connected in circuit with the main direct-current winding disposed to be operated to control the energization of the main direct-current winding, an auxiliary direct-current winding disposed on the reactor in inductive relation to the main direct-current winding, and means connected in circuit relation with the auxiliary direct-current winding and responsive to the voltage of the dynamo-electric machine disposed to operate the control means, the auxiliary direct-current winding being responsive to a change in the energization of the main direct-current winding to so control the voltage responsive means as to prevent excessive operation of the control means in response to the change in the voltage of the dynamo-electric machine.

3. In a regulating system for dynamo-electric machines provided with a field winding, in combination, a three-legged reactor, alternating-current windings disposed on the outer legs of the reactor connected in circuit relation with the field winding of the dynamo-electric machine, a main direct-current winding carried on the middle leg of the reactor disposed to be energized, means connected in circuit with the main direct-current winding disposed to be operated to control the energization of the main winding, an auxiliary direct-current winding disposed on the middle leg of the reactor in inductive relation to the main direct-current winding, and means connected in circuit relation with the auxiliary direct-current winding and responsive to the voltage of the dynamo-electric machine disposed to operate the control means, the auxiliary direct-current winding being responsive to a change in the energization of the main direct-current winding to so control the voltage responsive means as to prevent excessive operation of the control means in response to the change in the voltage of the dynamo-electric machine.

4. In a regulating system for dynamo-electric machines provided with a field winding, in combination, a three-legged reactor, alternating-current windings disposed on the outer legs of the reactor connected in circuit relation with the field winding of the dynamo-electric machine, a main direct-current winding carried on the middle leg of the reactor disposed to be energized, a variable resistor connected in circuit relation with the main direct-current winding for controlling the energization of the main winding, a plurality of contact members connected to separate points along the resistor, means responsive to the voltage of the dynamo-electric machine disposed to progressively move the contact members through a switching movement to successively control the connections to the resistor to control the saturation of the reactor thereby to control the field excitation of the dynamo-electric machine, and means comprising an auxiliary direct-current winding disposed on the middle leg of the reactor connected in circuit relation with the voltage responsive means for preventing excessive switching operations of the contact members in response to the change in the voltage of the dynamo-electric machine.

5. In a regulating system for dynamo-electric machines provided with a field winding, in combination, a saturable reactor connected in circuit relation with the field winding to control the field excitation of the dynamo-electric machine, a direct-current winding carried by the reactor disposed to be energized, a variable resistor connected in circuit with the direct-current winding, a plurality of contact members connected to separate points along the resistor, and means responsive to the voltage of the dynamo-electric machine disposed to progressively move the contact members through a switching movement to successively control the connections to the resistor to control the saturation of the reactor, said voltage responsive means also being connected in circuit relation with the reactor and responsive to a change in the saturation thereof to prevent excessive switching operations of the contact members in response to a change in the voltage of the dynamo-electric machine.

6. In a regulating system for dynamo-electric machines provided with a field winding, in combination, a saturable reactor connected in circuit relation with the field winding to control the field excitation of the dynamo-electric machine, a main direct-current winding carried by the reactor disposed to be energized, a variable resistor disposed to be adjustably connected in circuit with the main direct-current winding to control the energization of the main direct-current winding, an auxiliary direct-current winding disposed on the reactor in inductive relation to the main direct-current winding, and means connected in circuit relation with the auxiliary direct-current winding and responsive to the voltage of the dynamo-electric machine disposed to control the connecting of the variable resistor in circuit with the main direct-current winding, the auxiliary direct-current winding being responsive to a change in the energization of the main direct-current winding to so control the voltage responsive means as to prevent excessive adjustments in connecting the variable resistor in the main direct-current winding in response to the change in the voltage of the dynamo-electric machine.

CLINTON R. HANNA.